Sept. 10, 1935.    F. I. DEGEN    2,014,017
AGRICULTURAL IMPLEMENT
Filed April 13, 1935
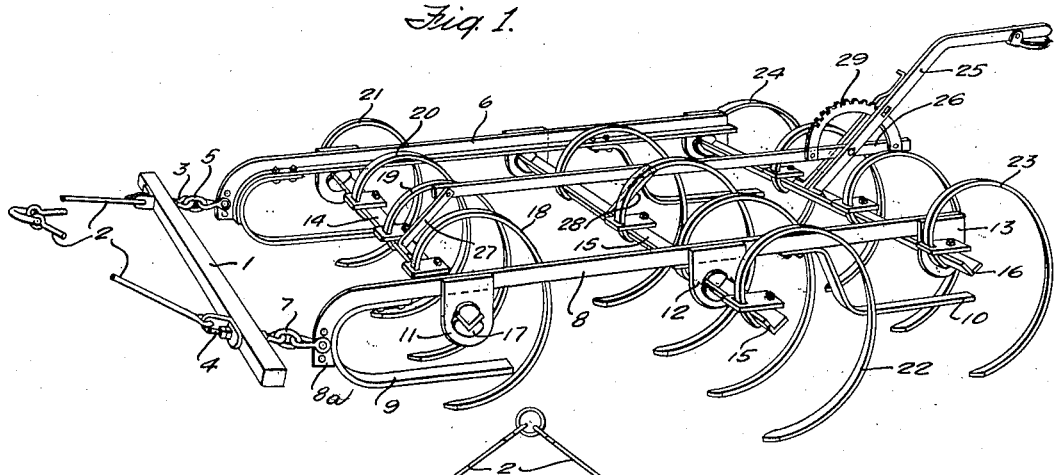
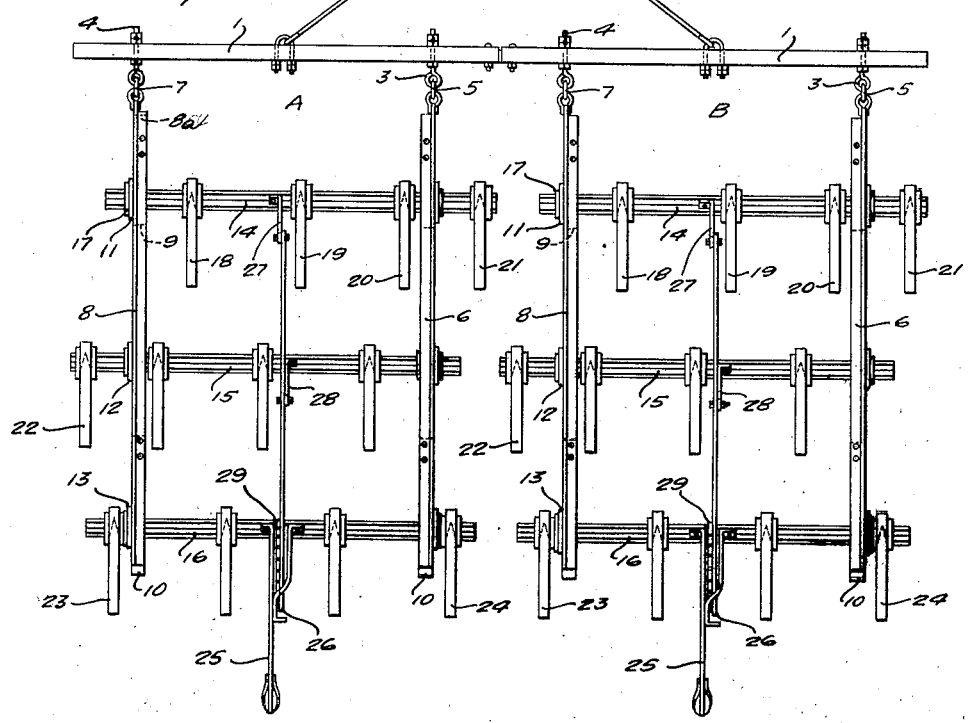
INVENTOR
Frederick I. Degen
BY
Victor D. Borst
ATTORNEY Patented Sept. 10, 1935

2,014,017

UNITED STATES PATENT OFFICE 2,014,017

AGRICULTURAL IMPLEMENT

Frederick I. Degen, Leonardsville, N. Y.

Application April 13, 1935, Serial No. 16,125

6 Claims. (Cl. 55—104)

The invention herein disclosed relates to agricultural implements, such as harrows, cultivators, weeders and the like and in particular to an implement of the kind disclosed in United States Letters Patent No. 1,812,461 granted June 30, 1931 on an application filed in the names of Isaac Babcock and Arthur W. Reynolds.

In Patent No. 1,812,461, there is disclosed and described a light, springy, flexible harrow which in operation vibrates or oscillates and the machine is kept comparatively free of trash. The harrow includes a draw-bar and two spaced side bars having their forward ends connected through a flexible link to the draw-bar. Extending between these side bars there are several tooth-carrying bars which are journaled in bearing brackets secured to and extending upwardly from the side bars, the teeth being mounted on the bars between the side bars. The tooth-carrying bars are loose in the bearings so that the harrow is very flexible and its construction is light and springy. These machines are used separately and in multiple including two or more units connected together side by side. In use, there is a tendency, in harrows and the like, as they have heretofore been constructed, for trash to collect between the side bars and the adjacent teeth, and when two units are connected together, trash also collects between the sections; and it is an object of this invention to minimize this tendency to collect trash and strengthen the machine without increasing the cost of materials.

In accordance with the invention, the side bars are elevated with respect to the axis of the tooth-carrying bars and the tendency for trash to accumulate between a side bar and an adjacent tooth is thus minimized, and each tooth-carrying cross-bar is assembled to extend through a bearing bracket on a side bar, and a tooth is mounted on the tooth-carrying bar on each side of the side bar carrying the bracket through which the cross-bar extends. Specifically, the side bars are raised with respect to the tooth-carrying bars by securing the bearing brackets to the side bars such that they extend downwardly from the side bars.

Such a harrow is illustrated in the accompanying drawing in which:

Fig. 1 is a perspective of a harrow constructed in accordance with this invention; and Fig. 2 is a plan of a harrow made up of two of the units illustrated in Fig. 1.

The illustrated embodiment of the invention is a sectional spring tooth harrow; one complete section is shown in Fig. 1 and a multi-section harrow is shown in Fig. 2. The harrow illustrated in Fig. 1 includes a draw-bar 1 with the usual draft connection 2 secured to the draw-bar by two eyebolts 3 and 4 which extend through the draw-bar, one adjacent each end thereof. The eye sections of the eyebolts are to the rear of the draw-bar and provide one link in a flexible connection which connects rearwardly extending angle irons which serve as side members or bars for the harrow. The eyebolt 3 serves as one link of a flexible connection 5 which connects the side bar 6 to the draw-bar and the eyebolt 4 forms one link in a flexible connection 7 connecting the side bar 8 to the draw-bar.

Each of the side bars can be identical in construction and, therefore, the side bar 8 will be described. As previously stated, these side bars are formed from an angle iron. The forward end of the bar 8 is bent to form a downwardly extending section 8a which extends at approximately right angles to the side bar. This section 8a has several openings therethrough to receive the flexible connection 7, several openings being provided for the adjustment of this connection. Adjacent the forward end of the side bar a runner 9 is secured to the under side of the bar. The runner is spaced from the side bar and has a curved forward section which extends up to and is secured to the side bar. The runner thus opens rearwardly and the collection of trash in the runner is avoided. A rear runner 10 is also provided, this runner being connected adjacent the rear end of the side bar. The runner 10 differs from the runner 9 in that it is in reality an offset flat bar, the offset spacing the runner from the side bar. These runners serve a twofold purpose which will hereinafter be explained.

Depending from the side bar 8, there are three bearing brackets 11, 12 and 13 spaced longitudinally of the side bar. Similar bearing brackets 11', 12' and 13' depend from the side bar 6. Extending between the side bars and journaled in these bearing brackets, there are tooth-carrying cross-bars 14, 15 and 16. These tooth-carrying cross-bars are journaled in loosely fitting bearings illustrated by the bearing 17 in the bracket 11. These bearings are in all respects similar to the loose fitting bearings illustrated and described in the aforementioned Babcock and Reynolds Patent No. 1,812,461 and serve to provide a loose flexible construction to the harrow. As will be clearly seen from the plan view of the multi-section harrow, which includes the sections A and B, the section A being the harrow section described, the tooth-carrying cross-bar 14 extends through the bearing bracket 11' which depends from the side bar 6 and the bar carries three spring teeth 18, 19 and 20 which are mounted on the cross-bar 14 between the side bars 6 and 8 and a spring tooth 21 which is mounted on the cross-bar 14 outside of the side bar 6 and at a substantial distance from the side bar 6. The cross-bar 15 extends through the bearing bracket 12 depending from the side bar 8. Like the cross bar 14, this bar carries three teeth between the side bars 6 and 8 and a tooth 22 mounted on the cross-bar 15 outside the side bar 8. The side bar 16 extends through both the bearings 13' and 13 depending respectively from the side bars 6 and 8. This latter cross-bar carries two teeth between the cross-bars and a tooth 23 outside the cross-bar 8 and another tooth 24 outside of the cross-bar 6. The teeth 23 and 24 are however mounted close to the side bars 6 and 8.

The harrow is provided with mechanism for rotating the cross-bars to swing the teeth to different positions. This mechanism includes a lever 25 which is secured to the cross-bar 16 and pivotally secured to a connecting bar 26 to which there are also secured connecting rods 27 and 28 extending from the cross-bars 14 and 15 respectively. On the connecting bar 26, there is mounted a segmental rack 29 and the lever carries suitable, well known means for cooperating with this segmental rack so that the cross-bars may be held in any particular angular position. When the teeth are in the elevated position thereof, the harrow rides upon the runners 9 and 10. When the lever is moved rearwardly, the teeth are brought into operative position, the extent that the lever is moved rearwardly determining the depth to which the teeth will be embedded in the earth. In Fig. 1, the teeth are illustrated in their operative position.

From the harrow section illustrated in Fig. 1, it will be seen that the side bars of the harrow are raised considerably when the teeth are in operative position, that is, in comparison to their elevation from the ground in constructions of the prior art. This minimizes the collection of trash between the side bars and the teeth adjacent thereto. Furthermore, the runners act as stabilizers. Due to the spring teeth and loose and flexible construction of the harrow, it vibrates when in operation and has a tendency to roll and pitch. However, the runners limit this tendency to roll and pitch and also serve to limit the depth of the digging by the teeth. The front runners prevent the machine from nosing into the ground. Thus, these runners perform the functions of acting as runners when the teeth are raised, of acting as stabilizers when the machine is operating or digging, and of limiting the depth of the digging by the teeth in accordance with the setting of the teeth.

From Fig. 2, it will be seen that these sections when mounted together to form a multi-section harrow, are separated by approximately the distance between two successive teeth. The arrangement of having successive cross-bars extend through the bearing brackets of opposite side bars provides a staggered arrangement of teeth between the sections similar to the arrangement of the teeth within each section. There is therefore no tendency for trash to collect between the adjacent side bars of two sections of a multi-section harrow.

From the above description of the embodiment illustrated in the drawing, it will be seen that the light flexible harrow has been strengthened and the tendency for trash to collect in the harrow is reduced to a minimum.

It will be obvious that various changes may be made by those skilled in the art in the details of the embodiment illustrated in the drawing and described above within the principle and scope of the invention as expressed in the appended claims.

I claim:

1. A harrow or the like comprising a draw-bar, a pair of spaced side bars extending rearwardly therefrom, flexible connecting means connecting each side bar to the draw-bar, bearing brackets on the side bars and extending downwardly therefrom, tooth-carrying cross-bars journaled in the bearing brackets on the side bars, teeth mounted on the cross-bars, and means secured to the side bars for stabilizing and supporting the harrow.

2. A harrow or the like comprising a draw-bar, a pair of spaced side bars extending rearwardly therefrom, flexible connecting means connecting each side bar to the draw-bar, bearing brackets on the side bars and extending downwardly therefrom, tooth-carrying cross-bars journaled in the bearing brackets on the side bars, teeth mounted on the cross-bars, and supporting brackets secured to the side bars and depending therefrom.

3. A harrow or the like comprising a draw-bar, a pair of spaced side bars extending rearwardly therefrom, flexible connecting means connecting each side bar to the draw-bar, bearing brackets on the side bars and extending downwardly therefrom, tooth-carrying cross-bars journaled in the bearing brackets on the side bars, teeth mounted on the cross-bars, and runners opening rearwardly secured to the side bars.

4. A harrow or the like comprising a draw-bar, a pair of spaced side bars extending rearwardly therefrom, flexible connecting means connecting each side bar to the draw-bar, bearing brackets having bearing openings therethrough extending downwardly from the side bars, a plurality of tooth-carrying cross-bars extending between the side bars, flanged bearing means fitting loosely within the opening in each bearing bracket for rotating the cross-bars in the bearing brackets, and runners opening rearwardly secured to the side bars.

5. A harrow or the like having a draw-bar, a pair of spaced side bars extending rearwardly therefrom and connected thereto by flexible connecting means, bearing brackets on the side bars and several tooth-carrying cross-bars extending laterally to the side bars and journaled in the bearing brackets; the harrow being characterized by the extension of each tooth-carrying bar through a bearing bracket and a tooth mounted on the tooth-carrying bar on each side of the side bar carrying the bracket through which the tooth-carrying bar extends.

6. A harrow or the like having a draw-bar, a pair of spaced side bars extending rearwardly therefrom and connected thereto by flexible connecting means, bearing brackets on the side bars and three spaced tooth-carrying cross-bars extending laterally to the side bars and journaled in the bearing brackets; the harrow being characterized by the forward cross-bar extending through the bracket on one side bar, the intermediate cross-bar extending through a bearing bracket on the other side bar and the rear cross-bar extending through the bearing brackets on both side bars, and a tooth mounted on each cross-bar outside of the side bar carrying the bracket through which the cross-bar extends.

FREDERICK I. DEGEN.